Feb. 15, 1955  J. F. JOHNSON  2,702,220
PACKING CUP
Filed Jan. 21, 1952

INVENTOR.
JULIET F. JOHNSON,
BY
ATTORNEY.

United States Patent Office 2,702,220
Patented Feb. 15, 1955

2,702,220
PACKING CUP

Juliet F. Johnson, Los Angeles, Calif.

Application January 21, 1952, Serial No. 267,417

5 Claims. (Cl. 309—33)

This invention relates to a packing cup used particularly in the oil industry for the purpose of sealing the space between an inner rod tube or mandrel which is positioned within a pipe, the cup sealing the annular space between the rod or the like and the inside of the pipe.

An object of my invention is to provide a novel packing cup which will effectively seal the space between an inner mandrel and a pipe, the packing cup being pressed against the inside of the pipe and also effectively sealing off against the mandrel or the like on which it is mounted.

A feature of my invetion is to provide a novel packing cup which will effectively seal the space between an inner mandrel and the inside of a pipe under high pressure.

Another object of my invention is to provide a novel packing cup, of the character stated, which may be moved longitudinally within a pipe and will still effectively seal off the space between an inner mandrel and the pipe, even though the cup is moved.

Still another object of my invention is to provide a novel packing cup of the character stated, which is simple in construction, is inexpensive to manufacture and effective in operation.

Other objects, advantages and features of invention may appear from the accompanying drawing, the subjoined detailed description and the appended claims.

Figure 1:
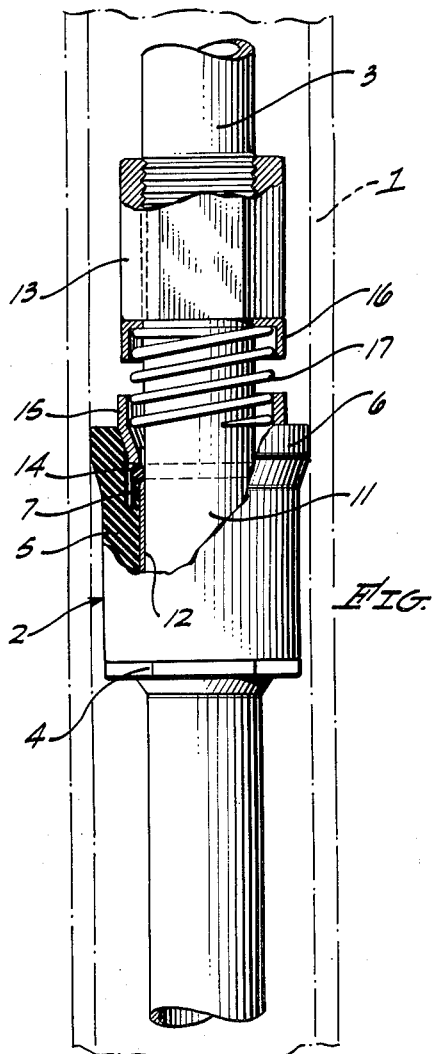
Figure 1 is a side elevation of my packing cup in operative position and with parts broken away to show interior construction.
Figure 2:
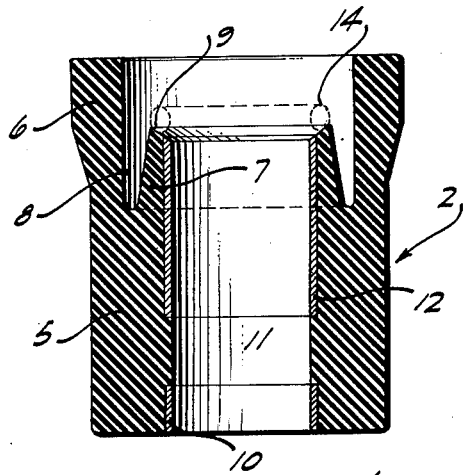
Figure 2 is a longitudinal sectional view of my packing cup.

Referring more particularly to the drawing, the numeral 1 indicates the usual type casing or tubing in which the packing cup 2 is placed. A mandrel rod or tube 3 is positioned within the pipe 1, and the space between this mandrel and the pipe must be packed off for the purpose of supporting a column of fluid above the packing cup. The packing cup must effectively seal off against the pipe, as well as against the mandrel, so as to prevent fluid leakage past the cup. A collar 4 is fixedly mounted on the mandrel 3, and the cup 2 rests on this collar, substantially as shown in Figure 1.

The cup 2 is preferably made of rubber or one of the flexible plastics and consists of an annular wall 5, the upper end of which is flared outwardly to provide a ring 6 integral with the body of the cup, and this ring is pressed outwardly against the pipe 1 by the weight or pressure of the fluid above the cup, and thus the cup seals off against the pipe to prevent leakage. An annular lip 7 is integrally formed with the wall 5 of the cup, and this lip surrounds the mandrel 3 and is spaced from the upper part of the wall 5, as shown at 8. A tapered seat 9 is formed on the upper end of the lip 7, the purpose of which will be subsequently described.

A steel ring 10 is imbedded in the wall of the cup at the lower end thereof and surrounding the central bore 11 of the cup. A second steel ring 12 is imbedded in the wall of the cup at the upper end of the bore 11. The purpose of these rings is to prevent the lower end of the cup from swelling outwardly away from the mandrel 3, and the upper ring holds the lip 7 against the mandrel 3 at all times. A nut 13 screws onto the mandrel 3 or is otherwise fixedly attached thereto. An O ring 14 rests on the seat 9 and surrounds the mandrel 3, as shown in Figure 1.

A metallic cup 15 rests on the O ring 14 and surrounds the mandrel 3. A second cup 16 rests against the bottom of the nut 13, and a coil spring 17 rests against the upper cup 16 and also against the lower cup 15, thus pressing the cup 15 against the O ring 14, to hold the O ring on the seat 9 for the purpose of sealing the mandrel 3 and preventing leakage around the mandrel.

Figure 4:
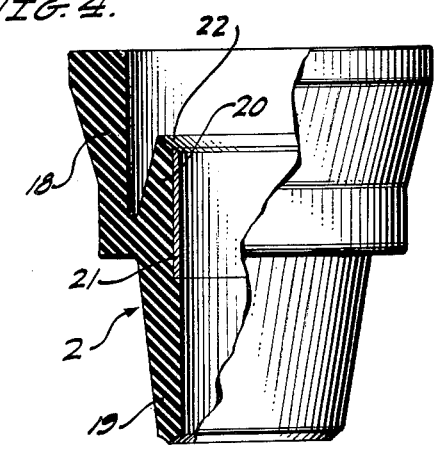
Figure 4 is a longitudinal sectional view of a modified form of packing cup.
Figure 3:
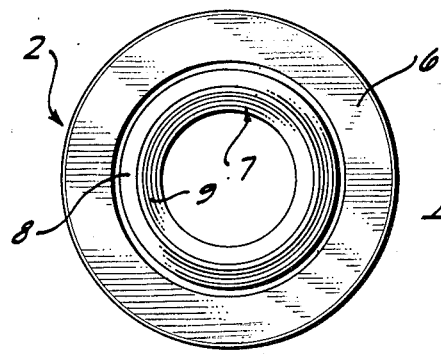
Figure 3 is a top plan view of the same.

In Figure 4 I have shown a modified form of packing cup in which the upper wall portion 18 tapers outwardly to engage the inside of the pipe or tubing, while the lower wall portion 19 tapers inwardly so that the cup may be positioned within a metal retainer having a tapered seat. The annular lip 20 is of the same construction as the lip 7, and the metal ring 21 has the same purpose as the ring 12, previously described. A tapered seat 22 is provided on the upper edge of the lip 20, and this seat has the same purpose as the seat 9 previously described.

In operation, the packing cup 2 is mounted on the mandrel 3 and may be moved longitudinally within the pipe 1 for such purposes as pressure testing of pipe, swabbing, cementing, etc. The cup 2 will compress and elongate under varying pressures, and consequently, the O ring 14 must be held down against the seat 9 by the spring 17, which pushes the cup 15 downwardly against the O ring, thus holding this ring on the seat 9 and against the outer surface of the mandrel 3. The flat outer face 6 of the packing cup will be pressed against the inside of the pipe 1, and will thus seal the space between the mandrel 3 and the inside of the pipe 1.

Having described my invention, I claim:

1. A packing cup having a central longitudinally extending bore therein, a lip adjacent the upper end of said bore, said lip being spaced inwardly from the wall of the cup, said lip having a seat on the upper edge thereof, and a metal ring imbedded in said lip, and a second metal ring imbedded in the wall of the cup at the lower end of said bore.

2. A packing cup having a bore extending longitudinally there through, an integral lip adjacent the upper end of said bore, said lip being spaced from the wall of the cup, a seat on the upper edge of the lip, a rod extending through said bore, an O ring surrounding the rod and resting on the upper edge of the lip, and means engaging the O ring and pressing said O ring against said seat.

3. A packing cup having a bore extending longitudinally there through, an integral lip adjacent the upper end of said bore, said lip being spaced from the wall of the cup, a seat on the upper edge of the lip, a rod extending through said bore, an O ring surrounding the rod and resting on the upper edge of the lip, and means engaging the O ring and pressing said O ring against said seat, said means including a ferrule bearing against said O ring, and a spring engaging the ferrule and pressing the same against the O ring.

4. A packing cup having a bore extending longitudinally there through, an integral lip adjacent the upper end of said bore, said lip being spaced from the wall of the cup, a seat on the upper edge of the lip, a rod extending through said bore, an O ring surrounding the rod and resting on the upper edge of the lip, and means engaging the O ring and pressing said O ring against said seat, and a metal ring imbedded in said lip.

5. A packing cup having a bore extending longitudinally there through, an integral lip adjacent the upper end of said bore, said lip being spaced from the wall of the cup, a seat on the upper edge of the lip, a rod extending through said bore, an O ring surrounding the rod and resting on the upper edge of the lip, and means engaging the O ring and pressing said O ring against said seat, said means including a ferrule bearing against said O ring, and a spring engaging the ferrule and pressing the same against the O ring, and a metal ring imbedded in said lip.

References Cited in the file of this patent

UNITED STATES PATENTS

| Number | Name | Date |
|---|---|---|
| 1,955,157 | Wayne | Apr. 17, 1934 |
| 2,067,499 | Millmine | Jan. 12, 1937 |
| 2,144,997 | Thaheld | Jan. 24, 1939 |
| 2,330,259 | Baker | Sept. 28, 1943 |
| 2,393,944 | Walley | Jan. 29, 1946 |
| 2,401,379 | Smith | June 4, 1946 |
| 2,417,887 | Schmidt | Mar. 25, 1947 |